(12) United States Patent
Khizroev et al.

(10) Patent No.: US 6,646,827 B1
(45) Date of Patent: Nov. 11, 2003

(54) PERPENDICULAR MAGNETIC RECORDING HEAD WITH WRITE POLE WHICH REDUCES FLUX ANTENNA EFFECT

(75) Inventors: Sakhrat Khizroev, Pittsburgh, PA (US); Dmitri Litvinov, Pittsburgh, PA (US); Billy Crue, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 185 days.

(21) Appl. No.: 09/757,433

(22) Filed: Jan. 10, 2001

Related U.S. Application Data
(60) Provisional application No. 60/175,320, filed on Jan. 10, 2000.

(51) Int. Cl.[7] .............................. G11B 5/16; G11B 5/20
(52) U.S. Cl. ...................................................... 360/125
(58) Field of Search .................................. 360/126, 125, 360/318.1, 110, 122

(56) References Cited

U.S. PATENT DOCUMENTS

| | | | |
|---|---|---|---|
| 4,138,702 A | | 2/1979 | Magnenet |
| 4,317,148 A | * | 2/1982 | Chi ............................ 360/125 |
| 4,438,471 A | | 3/1984 | Oshiki et al. |
| 4,541,026 A | | 9/1985 | Bonin et al. |
| 4,546,398 A | | 10/1985 | Toda et al. |
| 4,575,777 A | | 3/1986 | Hosokawa |
| 4,613,918 A | | 9/1986 | Kanai et al. |
| 4,649,449 A | | 3/1987 | Sawada et al. |
| 4,652,956 A | | 3/1987 | Schewe |
| 4,656,546 A | * | 4/1987 | Mallory ....................... 360/122 |
| 4,677,512 A | * | 6/1987 | Akiyama et al. ............ 360/110 |
| 4,731,157 A | | 3/1988 | Lazzari |
| 4,742,413 A | | 5/1988 | Schewe |
| 4,771,350 A | * | 9/1988 | Desserre ....................... 360/126 |
| 4,816,947 A | * | 3/1989 | Vinal et al. .................. 360/126 |
| 4,943,882 A | | 7/1990 | Wada et al. |
| 4,974,110 A | | 11/1990 | Kanamine et al. |
| 5,073,836 A | | 12/1991 | Gill et al. |
| RE33,949 E | | 6/1992 | Mallary et al. |
| 5,168,408 A | * | 12/1992 | Lazzari ...................... 360/318.1 |
| 5,225,953 A | | 7/1993 | Wada et al. |
| 5,738,927 A | | 4/1998 | Nakamura et al. |

FOREIGN PATENT DOCUMENTS

| | | | | |
|---|---|---|---|---|
| EP | 0362904 | | 8/1989 | |
| JP | 54128719 | | 5/1979 | |
| JP | 55-004734 | * | 1/1980 | ................ 360/126 |
| JP | 55055420 | | 4/1980 | |
| JP | 55080818 | | 6/1980 | |
| JP | 56087218 | | 7/1981 | |
| JP | 57033421 | | 2/1982 | |
| JP | 0 070 907 | * | 1/1983 | ................ 360/126 |
| JP | 59195311 | | 11/1984 | |
| JP | 59231720 | | 12/1984 | |
| JP | 60059515 | | 4/1985 | |
| JP | 60124014 | | 7/1985 | |
| JP | 02-297081 | * | 12/1990 | ........... G11B/5/127 |

* cited by examiner

*Primary Examiner*—George J. Letscher
*Assistant Examiner*—Christopher R Beacham
(74) *Attorney, Agent, or Firm*—Alan G. Tower, Esq.; Pietragallo, Bosick & Gordon

(57) ABSTRACT

A perpendicular magnetic recording head includes a write pole designed to reduce or eliminate problems caused by stray magnetic fields. By positioning a write coil close to the air bearing surface of the recording head, and controlling the geometry of the write pole, the necessity of a return pole to provide a closed magnetic flux path through the write pole and the magnetic recording media is eliminated. The use of an open magnetic path produced by a single write pole reduces or eliminates problems caused by stray magnetic fields which, in conventional perpendicular magnetic recording head designs, travel through the soft magnetic underlayer of the recording media and enter the recording head through the return pole.

18 Claims, 2 Drawing Sheets

PERPENDICULAR MAGNETIC RECORDING HEAD WITH WRITE POLE WHICH REDUCES FLUX ANTENNA EFFECT

CROSS REFERENCE TO RELATED APPLICATION

This application claims the benefit of U.S. Provisional Patent Application Serial No. 60/175,320 filed Jan. 10, 2000.

FIELD OF THE INVENTION

The present invention relates to perpendicular magnetic recording heads, and more particularly relates to a perpendicular recording head having a write pole and coil assembly which reduces or eliminates the flux antenna effect caused by stray magnetic fields.

BACKGROUND INFORMATION

Perpendicular magnetic recording systems have been developed for use in computer hard disk drives. A typical perpendicular recording head includes a trailing main pole, a leading return pole magnetically coupled to the main pole, and an electrically conductive magnetizing coil surrounding the main pole. The bottom of the return pole has a surface area greatly exceeding the surface area of the tip of the main pole.

Conventional perpendicular recording media typically include a hard magnetic recording upperlayer and a soft magnetic underlayer which provide a flux path from the trailing write pole to the leading return pole of the writer.

To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the return pole and then passing under the main pole. Current is passed through the coil to create magnetic flux within the main pole. The magnetic flux passes from the main pole tip, through the hard magnetic recording track, into the soft underlayer, and across to the return pole.

The closed magnetic flux path provided by the trailing pole, soft underlayer and return pole increases efficiency of such conventional systems. The soft underlayer also effectively doubles the recording layer thickness through the effect of magnetic imaging. Furthermore, the soft underlayer advantageously increases vertical field gradients in the recording media through the magnetic imaging effect.

However, a problem associated with the use of soft underlayers is that such layers cause extreme sensitivity of the perpendicular recording system to stray magnetic fields. For example, stray fields of approximately 5 Oe, e.g., from a voice coil motor, may be sufficient to cause data instability and to initiate random erasing of previously written information. This problem resulting from stray magnetic fields is known as the flux antenna effect.

The present invention has been developed in view of the foregoing.

SUMMARY OF THE INVENTION

The present invention provides a perpendicular magnetic recording head including a write pole which does not require a return pole, and a write coil relatively close to the air bearing surface of the head.

An aspect of the present invention is to provide a perpendicular magnetic recording head comprising a write pole, a magnetizing coil for generating magnetic flux in the write pole, and means for substantially eliminating the flux antenna effect during operation of the recording head.

Another aspect of the present invention is to provide a perpendicular magnetic recording head comprising a write pole having a tip located adjacent an air bearing surface of the recording head, and a magnetizing coil at least partially surrounding the write pole and positioned sufficiently close to the air bearing surface to eliminate the need for a return pole in proximity to the air bearing surface.

A further aspect of the present invention is to provide a perpendicular magnetic recording system comprising a perpendicular magnetic recording medium including a hard magnetic recording layer and a soft magnetic underlayer, and a perpendicular magnetic recording head positionable over the medium. The recording head comprises a write pole having a tip located adjacent an air bearing surface of the recording head, and a magnetizing coil at least partially surrounding the write pole. The perpendicular magnetic recording medium and the write pole define an open magnetic flux path. The magnetizing coil may be positioned sufficiently close to the soft magnetic underlayer during operation of the recording head to eliminate the need for a return pole in proximity to the soft magnetic underlayer.

These and other aspects of the present invention will be more apparent from the following description.

DETAILED DESCRIPTION

Figure 1:
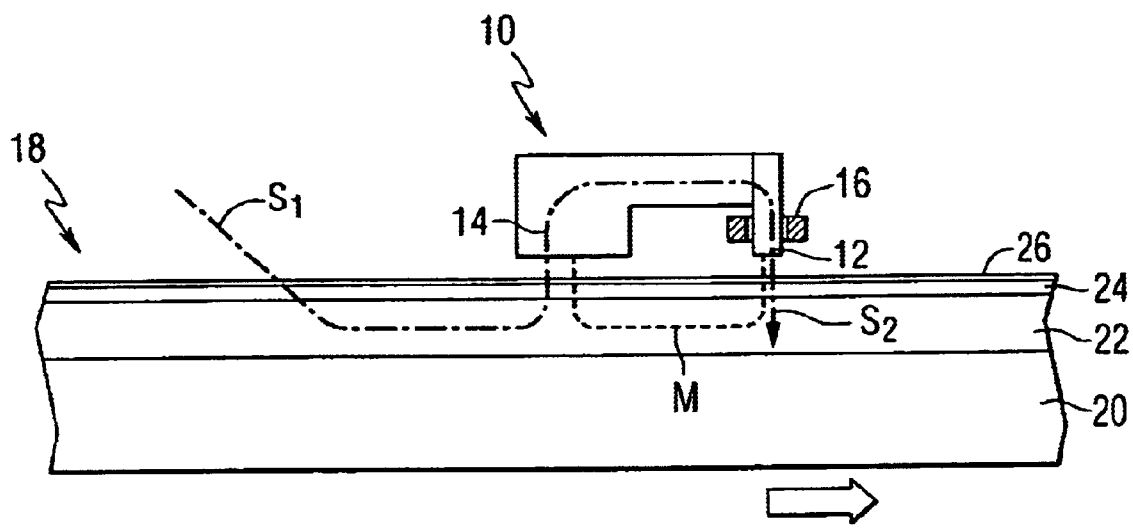
FIG. 1 is a partially schematic sectional side view of a conventional perpendicular magnetic recording system including a writer having a trailing main pole and a leading return pole, illustrating the problem caused by a stray magnetic field which travels through the soft underlayer of the recording media, and which is amplified as it travels through the head from the return pole to the main pole.

FIG. 1 schematically illustrates a perpendicular recording head 10 which includes a trailing main write pole 12 and a leading return pole 14. A magnetizing coil 16 surrounds the main pole 12. The perpendicular recording head 10 is positioned above a magnetic recording disk 18. The disk 18 includes a substrate 20, a soft magnetic underlayer 22, a hard magnetic recording layer 24 and a protective layer 26. The disk 18 may also include a magnetic decouple layer (not shown) between the soft underlayer 22 and recording layer 24.

As shown in FIG. 1, when current is passed through the coil 16, a closed magnetic flux path is generated which travels along a path M from the tip of the main pole 12 perpendicularly through the recording layer 24, across the soft underlayer 22 to the return pole 14. A problem associated with the design shown in FIG. 1 is that stray magnetic fields $S_1$ enter the soft underlayer 22 of the disk 18 and, due to the closed magnetic path between the opposing pole 14 and the main pole 12, are drawn into the recording head 10 through the opposing pole 14. The stray magnetic fields $S_1$ may be produced by such sources as voice coil motors (up to 50 Oe fields), and some bit patterns under the leading pole which can generate fields up to 50 Oe and higher due to the soft underlayer.

As shown in FIG. 1, stray fields $S_1$ under the return pole 14 get amplified approximately by the ratio of the area of the return pole 14 to the area of the main pole 12. This causes a deleterious flux antenna effect. With this ratio being approximately 50 for typical designs, the fields $S_2$ can be amplified, e.g., up to 2,500 Oe, under the main pole. This can be sufficient to cause data instability or even erase previously written information.

Figure 2:
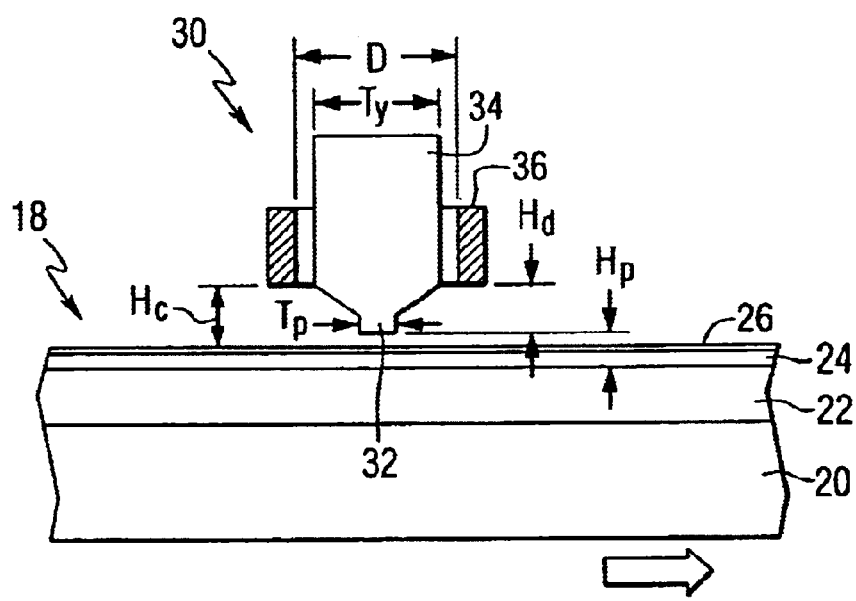
FIG. 2 is a partially schematic sectional side view of a perpendicular magnetic recording head in accordance with an embodiment of the present invention. The head includes a write pole without a return pole in proximity to the air bearing surface of the recording head, and a write coil which is located close to the air bearing surface of the head.

FIG. 2 schematically illustrates a single pole perpendicular recording head 30 in accordance with an embodiment of the present invention. The perpendicular recording head 30 includes a single write pole tip 32 extending from a yoke 34. The write pole tip 32 and yoke 34 may be made of any suitable magnetically permeable material such as NiFe, FeAlN, FeTaN, CoFe, CoFeB, CoFeN or any other soft magnetic materials, including multiple layers of such materials. A magnetizing coil 36 surrounds the yoke 34. The magnetizing coil 36 may be made of any suitable electrically conductive material such as Cu, Ag, Au or any other high conductivity materials or alloys.

As shown in FIG. 2, the perpendicular recording head 30 is positioned above the magnetic storage disk 18. The soft underlayer 22 of the disk 18 may be made of any suitable materials such as NiFe, FeAlN, FeTaN, CoFe, CoFeB, CoFeN or any other soft magnetic materials, including multiple layers of such materials. The recording layer 24 may be made of any suitable materials such as CoPt, FePt, CoPd, FePd or multi-layers of Co/Pt and Co/Pd.

In accordance with the present invention, the geometry of the recording head 30 is controlled in order to eliminate the necessity of a return pole. The yoke 34 may have a thickness $T_y$ which is larger than the thickness $T_p$ of the write pole tip 32. The ratio of $T_y$:$T_p$ may range from about 1:1 to about 10:1. The yoke thickness $T_y$, may typically be from about 0.1 to about 5 micron, for example, from about 0.1 to about 1 micron. The main pole tip thickness $T_p$ may be from about 0.01 to about 1 micron, for example, from about 0.1 to about 0.5 micron. The magnetizing coil 36 has a dimension D which in the embodiment shown in FIG. 2 is larger that the yoke thickness $T_y$. Alternatively, the dimension D of the magnetizing coil 36 may be the same as the yoke thickness $T_y$, or the coil 36 may be imbedded in the yoke 34. The coil dimension D may range from about 0.1 to about 3 micron.

As shown in FIG. 2, the magnetizing coil 36 is positioned at a distance $H_c$ above the soft underlayer 22. The distance $H_c$ between the coil 36 and the soft underlayer 22 may be from about 0.5 to about 1.5 micron. The tip of the main pole 32 is positioned a distance $H_p$ above the soft underlayer 22. The distance $H_p$ between the tip of the write pole 32 and the soft underlayer 22 is preferably from about 10 to about 30 nm, for example, from about 10 to about 15 nm. The distance between the lower surface of the magnetizing coil 36 and the tip of the main pole 32 is designated as $H_d$. The distance $H_d$ between the coil 36 and the tip of the write pole tip 32 may be from about 0.2 to about 1.5 micron, for example, from about 0.3 to about 1 micron. The dimension D of the coil 36 should be comparable to the distance $H_c$ between the coil and the soft underlayer. The ratio of $H_c$:D may be from about 1:10 to about 2:1. Similarly, since the distance $H_p$ is relatively small, the ratio of $H_d$:D may be from about 1:10 to about 2:1.

By controlling the geometry of the recording head 30 and positioning the magnetizing coil 36 sufficiently close to the air bearing surface of the head and sufficiently close to the soft underlayer 22, an open magnetic flux path is achieved in accordance with the present invention. Thus, the necessity of a closed flux path through a return pole, e.g., as shown in FIG. 1, is eliminated, thereby effectively eliminating the flux antenna effect.

Although the magnetizing coil 36 shown in FIG. 2 comprises a single winding, multiple windings and/or other coil shapes may be used. For example, the coil 36 may alternatively be square, rectangular, straight, etc. Instead of completely surrounding the yoke 34, the magnetizing coil 36 may partially surround the yoke. For example, the magnetizing coil could be a straight wire that extends across one side of the yoke 34. The cross-sectional shapes of the write pole 32 and yoke 34 may be round, square, rectangular or the like. In the embodiment shown in FIG. 2, the tip of the right pole 32 comprises a flat surface. Alternatively, a concave pole tip may be used, such as the concave pole tips described in U.S. patent application Ser. No. 09/665,598, filed Sep. 19, 2000, entitled "Perpendicular Recording Head Including Concave Tip", which is incorporated herein by reference.

The amount of electrical current supplied to the magnetizing coil 36 is selected such that satisfactory writing to the disk 18 is achieved. For example, in the system shown in FIG. 2, a current of from about 50 mA×turn to about 150 mA×turn may be satisfactory.

In typical head structures such as shown in FIG. 1, the distance between the coil 16 and the soft underlayer 22 is typically 3 micron or higher. In such designs, the efficiency of the head and soft underlayer system is an essential factor in determining recording performance. At a 3 micron separation between the coil and a soft underlayer, 3D-boundary element modeling indicates that if the return pole 14 is removed the current needed for saturation of the system increases by a factor of 10. However, if the distance between the coil and the soft underlayer is decreased to 0.5 micron, the saturation write current will increase only by approximately 80 percent. The advantages of the soft underlayer resulting from the magnetic imaging effect are retained without a closed magnetic path. Thus, in accordance with the present invention, the field gradients do not change significantly when the return path is removed by eliminating the return pole.

Figure 3:
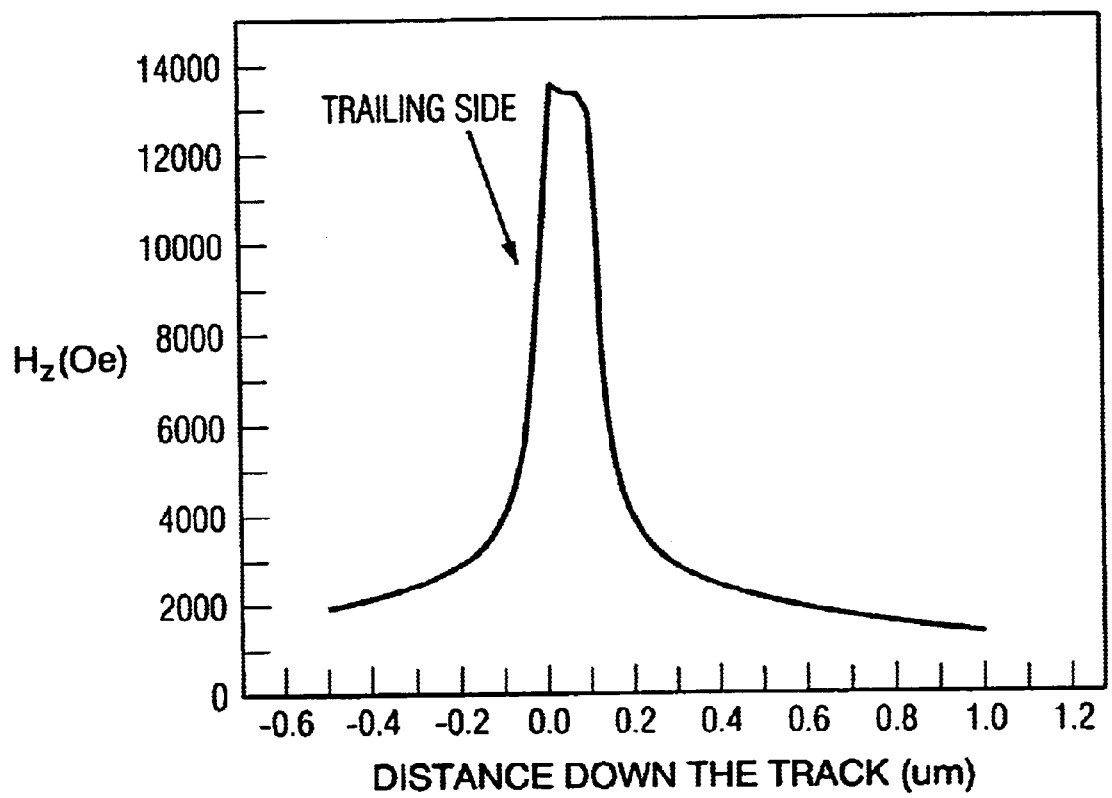
FIG. 3 is a graph of vertical magnetic field versus distance down the track for a perpendicular magnetic recording head.

The vertical field versus the distance down the track at a 30 nm separation between the air bearing surface and a soft underlayer at saturation is shown in FIG. 3. The head material moment, $B_s$, is assumed to be 16 kGauss for the results shown in FIG. 3. This field profile is the same for a closed path system, shown in FIG. 1, and the present system without a return pole, shown in FIG. 2, at saturation currents of approximately 75 mA×turn and 135 mA×turn, respectively.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
   a write pole including a tip located adjacent an air bearing surface of the recording head and a yoke having a thickness greater than a thickness of the write pole tip located away from the air bearing surface; and
   a magnetizing coil positioned in proximity to the air bearing surface and at least partially surrounding the yoke for generating magnetic flux in the write pole, wherein the magnetizing coil is oriented in a plane substantially parallel with the air bearing surface and has a lower surface located a substantially uniform distance from the air bearing surface.

2. The perpendicular magnetic recording head of claim 1, wherein the recording head does not include a return pole.

3. The perpendicular magnetic recording head of claim 1, wherein the magnetizing coil is located sufficiently close to the air bearing surface to eliminate the need for a return pole in proximity to the air bearing surface.

4. A perpendicular magnetic recording head comprising:

a write pole including a tip located adjacent an air bearing surface of the recording head and a yoke having a thickness greater than a thickness of the write pole tip located away from the air bearing surface; and a magnetizing coil at least partially surrounding the yoke and positioned in proximity to the air bearing surface, wherein the magnetizing coil is oriented in a plane substantially parallel with the air bearing surface and has a lower surface located a substantially uniform distance from the air bearing surface, and the recording head does not include a return pole in proximity to the air bearing surface.

5. The perpendicular magnetic recording head of claim 4, wherein the yoke has a distal end located farther away from the air bearing surface than the magnetizing coil.

6. The perpendicular magnetic recording head of claim 5, wherein the yoke at least partially surrounded by the magnetizing coil extends in a direction substantially parallel with an axis defined by the write pole tip.

7. The perpendicular magnetic recording head of claim 4, wherein the magnetizing coil has a dimension D measured from an axis defined by the write pole, the magnetizing coil has a pole tip distance $H_d$ measured from the magnetizing coil to the write pole tip in a direction parallel with the write pole axis, and the ratio $H_d$:D is from about 1:10 to about 2:1.

8. The perpendicular magnetic recording head of claim 7, wherein the distance $H_d$ is from about 0.2 to about 1.5 micron.

9. The perpendicular magnetic recording head of claim 8, wherein the distance $H_d$ is from about 0.3 to about 1 micron.

10. The perpendicular magnetic recording head of claim 7, wherein the dimension D is from about 0.1 to about 3 micron.

11. A perpendicular magnetic recording system comprising:

(a) a perpendicular magnetic recording medium including a hard magnetic recording layer and a soft magnetic underlayer; and (b) a perpendicular magnetic recording head positionable over the medium, the recording head comprising:

(i) a write pole including a tip located adjacent an air bearing surface of the recording head and a yoke having a thickness greater than a thickness of the write pole tip located away from the air bearing surface; and (ii) a magnetizing coil at least partially surrounding the yoke, wherein the magnetizing coil is oriented in a plane substantially parallel with the air bearing surface and has a lower surface located a substantially uniform distance from the air bearing surface, and the perpendicular magnetic recording medium and the write pole define an open magnetic flux path.

12. The perpendicular magnetic recording system of claim 11, wherein the yoke has a distal end located farther away from the air bearing surface than the magnetizing coil.

13. The perpendicular magnetic recording system of claim 11, wherein the yoke at least partially surrounded by the magnetizing coil extends in a direction substantially parallel with an axis defined by the write pole tip.

14. The perpendicular magnetic recording system of claim 11, wherein the magnetizing coil has a dimension D measured from an axis defined by the write pole, the magnetizing coil has a distance $H_c$ between the magnetizing coil and the soft magnetic underlayer, and the ratio of $H_c$:D is from about 1:10 to about 2:1.

15. The perpendicular magnetic recording system of claim 14, wherein the distance $H_c$ is from about 0.5 to about 1.5 micron.

16. The perpendicular magnetic recording system of claim 14, wherein the dimension D is from about 0.1 to about 3 micron.

17. The perpendicular magnetic recording head of claim 1, wherein the yoke at least partially surrounded by the magnetizing coil extends in a direction substantially parallel with an axis defined by the write pole tip.

18. The perpendicular magnetic recording head of claim 1, wherein the magnetizing coil has a dimension D measured from an axis defined by the write pole, the magnetizing coil has a pole tip distance $H_d$ measured from the magnetizing coil to the write pole tip in a direction parallel with the write pole axis, and the ratio $H_d$:D is from about 1:10 to about 2:1.

* * * * *